Patented Oct. 10, 1939

2,175,393

UNITED STATES PATENT OFFICE 2,175,393

PRODUCTION OF PHENOLIC-FORMALDEHYDE RESINS

Winfrid Hentrich, Dusseldorf-Reisholz, and Fritz Schlegel, Dusseldorf, Germany, assignors to Henkel & Cie. G. m. b. H., Dusseldorf-Holthausen, Germany, a corporation of Germany No Drawing. Application March 24, 1937, Serial No. 132,720. In Germany April 3, 1936

8 Claims. (Cl. 260—53)

This invention relates to the preparation of condensation products, most of which have resinous or resin-like properties, by reacting or condensing phenols, olefine compounds and low molecular aldehyde compounds.

An object of the invention is to provide a process of preparing a series of condensation products which vary in properties from resinous viscous liquids to resin-like solid masses of different degrees of hardness, the said variation in properties being obtainable by merely using different members of certain classes and proportions of raw materials under different reaction conditions.

The specific object of the invention is to provide a general process suitable for the production of such series of condensation products, which process as compared with other known processes leads to exceptionally high yields of commercially valuable condensation products.

Broadly considered, the process of the present invention involves the reaction of phenol compounds, olefine compounds and low aliphatic aldehyde compounds with the aid of perchloric acid and in some instances other agents which assist in the reaction. Considered from the standpoint of pure chemistry, the process is composed of two steps; the first being a reaction between the phenol and the olefine and the second between the resulting alkylated phenol and the aldehyde.

In accordance with the preferred embodiment of the invention, the two reactions are carried out simultaneously in at least a substantial part. For example, the phenol and the aqueous perchloric acid solution are mixed together and heated to a temperature at which the reaction will proceed at a satisfactorily rapid rate. Then the olefine and the aldehyde are gradually introduced into the solution during stirring, the heating and stirring being continued after the addition is finished until a condensation product appearing as a syrupy mass is obtained.

In accordance with a second embodiment of the invention, the two reaction steps are carried out separately. The phenol and the olefine are reacted in the presence of perchloric acid to form an alkylated phenol. This alkylated phenol, if desired after purification, is then condensed with the aldehyde at an elevated temperature. For most efficient operation, this latter reaction requires the use of a condensing agent which, however, may be of an acid neutral or basic character.

The proportions of ingredients employed in the reactions of the present process depend upon the nature of the product desired. For example, the olefine and the phenol may be reacted in molar proportions, if a monoalkylated phenol is desired. However, an excess of olefine may be used to obtain phenolic compounds having two alkyl radicals. The reaction between these ingredients is caused to take place through the simultaneous action of heat and an equeous solution of perchloric acid. The concentration of this perchloric acid solution is not critical but for most efficient operation should be between about 40 and 70% perchloric acid. Generally, the reaction of the phenol and the olefine starts at a comparatively low temperature, for example, at 40° C. However, in order to complete the reaction in a reasonable time, the reaction mass should be heated to temperatures generally of from 60 to 90° C. During this reaction, however, the water of the solution must not be removed entirely, for if the water is lost, the concentration of the perchloric acid becomes too great for efficient operation.

The preferred olefine compounds used in accordance with the present invention are the olefine hydrocarbons themselves. However, other olefinic compounds may be used, for example, olefine acids, alcohols, ethers, sulfones and the like. Suitable examples of olefines are propylene, the isomeric butylenes, amylenes, hexenes, heptenes, and as well the higher molecular olefines such as the isomeric octenes, decenes, dodecenes and octadecenes. It is not necessary for the operation of the process to employ pure compounds for commercial or technical products or mixtures of olefines alone, or with other substances, may be used without difficulty. Olefines may be obtained from many sources such as those which are developed in connection with the thermal decomposition of organic substances as hydrocarbons or those from any number of other commercially operable processes. Suitable olefines are obtained, for example, by the carbonization of wood, the slow decomposition of brown coal, the cracking of petroleum and paraffines and as well from the various benzine syntheses known to the arts. Other suitable sources of olefines are from the olefine-containing fractions of synthetic hydrocarbon mixtures obtained through the reaction of carbon monoxide and hydrogen. Cycloaliphatic compounds of olefinic character, for example, cyclohexene, its homologues and analogues, can also be used in the instant process. Diolefines or other more unsaturated compounds also may be employed, if so desired. Olefinic compounds wherein the hydrocarbon chain is interrupted by oxygen, sulfur or nitrogen may also be used. Furthermore, those olefines may be employed which contain still other groups such, for example, as the hydroxyl radical or carboxyl groups, for instance, oleyl alcohol and oleic acid. Olefines which contain aromatic radicals, such as styrol are also in the scope of the present invention.

Since alcohols react like olefines for the most part with phenols in the presence of perchloric acid, the invention extends to such alcohols and they are considered herein as being within the term "olefine compounds". Suitable alcohols include the monohydroxy and polyhydroxy low molecular alcohols and also the corresponding higher molecular alcohols which may have either a straight or a branched chain. Examples of other alcohols are cycloaliphatic alcohols and aromatic alcohols such as benzyl alcohol and menaphthyl alcohol.

The preferred phenolic compound of the present invention is phenol itself. However, equally good results are obtainable with phenolic compounds containing various radicals either of a short or long chain attached to the nucleus such as cresols, xylenols, ethyl phenols, thymol, carvacrol, and the like. Polynuclear phenols and their derivatives may also be employed, examples of such compounds being hydroxy diphenyls and alpha-naphthol. The aromatic ring of the phenol may contain various types of atoms and radicals as the halogens, methoxyl radicals, carboxylic radicals, and the like. Other phenolic compounds which may be used include those having two or more hydroxyl groups such as resorcin, pyrogallol, phloro-glucin and their homologues, analogues and substitution products. It is not necessary that the phenols be used in a pure form for they may be used in admixture with other substances. Frequently, goods results are obtained by using mixtures of phenols of different molecular weight or structure. Other derivatives are included within the broader scope of the invention, such, for example, as the ethers of phenols.

As has been stated, the second reaction of the process of the present invention involves the reaction brought about by the use of low aliphatic aldehyde compounds. Such compounds include the aldehydes themselves and as well those derivatives which react in a similar manner. Formaldehyde and formaldehyde-yielding products are preferred. They may be used in aqueous solutions of the most varied concentration. Other suitable aldehyde compounds include the polymerization products as trioxy-methylene, polyoxy-methylene, paraformaldehyde and their derivatives, additive compounds and addition products such as hexamethylene-tetramine, and the like.

The condensation of the alkylated phenolic compound with the low molecular aliphatic aldehyde compound in the presence of a condensation agent may take place also in the presence of other compounds, such, for example, as inert substances, fillers, dyestuffs and plasticizing agents. Furthermore, fats, oils and drying oils, as castor oil, linseed oil, and wood oil, may be present. For the preparation of products of particular properties, there may also or alternatively be included such substances as waxes like montan wax, resins like colophony, copal and dammar, artificial resins like cumarone resin, urea-formaldehyde condensation products or esterification products of the above mentioned natural and artificial resins with monohydroxy or polyhydroxy alcohols.

Valuable products may also be obtained by carrying out the reaction of the present invention in the presence of various esters, for example, benzoic acid esters, salicylic acid esters and cellulose esters. Other esters which may be used include those produced from polybasic acids and polyvalent alcohols such as the phthalic acid esters of glycerine. Suitable esters for use in the reaction may also be obtained by reacting polyvalent alcohols and polybasic acids or monobasic acids, fats, oils and resins or the acids of such substances. Finally, the esters of inorganic acids with organic hydroxy compounds such as tricresyl phosphate may be employed. Instead of incorporating these esters in the reacting mass composed of the alkylated phenol and the aldehyde compound, such substances may be caused to react with the resulting condensation products in a subsequent treatment. Such procedure is considered within the scope of the present invention.

One of the features of the present invention lies in its adaptability for the production of resinous products of varying properties by altering the time of the reaction. The reaction therefore is capable of being conducted in several stages. For example, when the condensation of the alkylated phenol and the aldehyde compounds is carried out under alkaline conditions, a product of low softening point is frequently obtained. The softening point of the resins produced in this manner can be raised, however, simply by a subsequent heat treatment. Thus, products which are very viscous when first obtained may be converted into solid, hard resins by a simple treatment. The process of the present invention may be conveniently carried out in a comparatively small amount of apparatus. For example, the second condensation reaction may take place in the same vessel wherein the initial or alkylation reaction takes place. As stated, in the preferred embodiment, the alkylation and condensation are for the most part simultaneously effected. Where the two reactions are carried out only in part simultaneously and the addition of the olefine completed before the addition of the aldehyde, more satisfactory results are frequently obtained if the temperature of the reaction mass is increased during the latter part of the process after the alkylation reaction is complete.

The invention may be readily understood by the following examples in which the parts of the substances used are given by weight.

*Example 1*

A mixture is prepared of 470 parts of phenol and 84 parts of a 60% aqueous solution of perchloric acid. This mixture is heated to 80° C. and 280 parts of alpha-butylene are then introduced therein. After a short time, yet during the introduction of the alpha-butylene, 75 parts of trioxymethylene are added in small portions. Then 75 parts of a 40% solution of formaldehyde are subsequently added in order to complete the reaction, the mass being stirred for another hour. The product obtained by this reaction has the appearance of colophony. It is soluble in methyl alcohol, ethyl alcohol, butyl alcohol, ether, ethyl acetate, butyl acetate, amyl acetate, acetone, cyclohexanol, methylcyclohexanol, cyclohexanone, methylcyclohexanone and toluene.

*Example 2*

Five hunded and sixty-one parts of alpha-butylene are introduced into 940 parts of phenol in the presence of 167 parts of a 60% aqueous solution of perchloric acid at a temperature of 70–80° C. in an apparatus provided with a reflux condenser. After the reaction is complete, the product obtained is washed with water until it is neutral and is then purified by fractional distillation with the aid of a vacuum. One hundred and fifty parts of isobutyl phenol thus obtained, together with 75 parts of a 20% aqueous solution of sulfuric acid and 75 parts of a 40% solution of formalin, are then heated in the reflux condenser to about 100° C. for a period of seventeen hours during stirring. The final product obtained is a colophony-like resin which is soluble in many solvents, for example, in ethyl acetate, butyl acetate, amyl acetate, cyclohexanone, methylcyclohexanol, xylene and tetrahydronaphthalene.

The process of this example may be caused to produce a soft resin by simple alterations. For example, the reaction period may be reduced to about nine hours, or the quantity of the formaldehyde may be decreased, for example, to half of the quantity specified.

*Example 3*

One thousand one hundred and twenty-two parts of alpha-butylene are introduced into 940 parts of phenol in the presence of 167 parts of a 60% perchloric acid solution at a temperature of 70 to 80° C. in an apparatus provided with a reflux condenser. Two hundred and six parts of the di-isobutyl phenol thus obtained are heated with 75 parts of a 40% solution of formaldehyde in the presence of 75 parts of 20% sulfuric acid to a temperature of 100° C. for a period of sixteen hours, during constant stirring. A viscous reaction mass is obtained which is soluble in the solvents described in Example 2.

*Example 4*

Two hundred and six parts by weight of the di-isobutyl phenol prepared in accordance with the process of Example 3 are heated to 40 to 50° C. for a period of six hours in the presence of 100 parts of a 40% solution of formaldehyde and 25 parts of a 40% aqueous solution of caustic soda. The product obtained from this process is a viscous adhesive which dissolves readily in the solvents described in Example 2.

*Example 5*

To a mixture of 564 parts of phenol and 100 parts of a 60% perchloric acid solution there are added 560 parts of alpha-octene at a temperature of 70 to 80° C. The addition is made in small increments during stirring. One hundred and three parts of the secondary octylphenol obtained in this manner are condensed with 37.5 parts of a 40% solution of formaldehyde in the presence of 50 parts of a 20% sulfuric acid solution. The condensation is brought about by heating to 100° C. during the period of nine hours under a reflux condenser. The final product obtained is a soft resin. It is soluble in methyl alcohol, ethyl alcohol, butyl alcohol, ether, acetone, ethyl acetate, butyl acetate, amyl acetate, cyclohexanol, methylcyclohexanol, cyclohexanone, methylcyclohexanone, dioxane, tetrahydronaphthalene, various mineral oil fractions, carbon tetrachloride and in linseed oil-stand oil.

If the above reaction is altered by using only half the quantity of the formaldehyde described, a somewhat similar product can be obtained.

*Example 6*

One hundred and three parts of the secondary octylphenol obtained in accordance with Example 5 is condensed with 50 parts of a 40% solution of formaldehyde in the presence of 15 parts of a 40% solution of caustic soda. By heating this mixture for seven hours to a temperature of 120 to 150° C. and then heating for an additional three hours at 180 to 200° C., a resin is obtained which is hard when cold and possesses the ready solubility of the product described in Example 5.

*Example 7*

One thousand one hundred and seventy-six parts of alpha-dodecene are slowly added during stirring into 752 parts of phenol and 133 parts of a 60% perchloric acid solution while the same is maintained at a temperature of 70–80° C. One hundred and thirty-one parts of the secondary dodecyl phenol obtained in this manner are then mixed with 37.5 parts of a 40% solution of formaldehyde and 50 parts of a 20% sulfuric acid solution during a period of twenty hours, at a temperature of 100° C. A very viscous condensation product is obtained which is soluble in the solvents described in Example 5.

A somewhat less viscous condensation product can be obtained if this process is altered by using only half the quantity of the formaldehyde specified therein.

*Example 8*

One hundred and thirty-one parts of the secondary dodecyl phenol obtained according to the process of Example 7 are heated to 50° C. in the presence of 15 parts of a 40% solution of caustic soda and 50 parts of a 40% solution of formaldehyde. After continuing the heating for five hours, a viscous liquid oil is obtained which likewise is soluble in the solvents described in Example 5.

As will be noticed from the above examples, final products are obtained which vary considerably in properties. Some of the products are resinous viscous liquids, whereas others are resinous solid substances of different degrees of hardnes. It will also be noticed that the products obtained are soluble in the most varied types of organic solvents including hydrocarbons and oils. For these reasons, the resinous materials obtained in accordance with the processes of the present invention are valuable as raw materials for the production of lacquers. They also are suitable as softeners, as various film-forming agents and as resin substitutes in many compositions. The viscous liquid reaction products are also suitable for the production of adhesives.

It should be understood that the present invention is not limited to the specific examples of materials, the specific reaction conditions, or the specific procedures hereinbefore described, but that it extends to all equivalent materials, conditions and procedures coming within the scope of the appended claims.

We claim:

1. The process of producing condensation products which comprises condensing a phenol, an olefine and a low molecular aliphatic aldehyde compound selected from formalydehyde and its polymers, with the aid of perchloric acid.

2. The method of producing condensation products which comprises mixing phenol and an aqueous solution of perchloric acid, adding thereto an aliphatic olefine at an elevated temperature between about 40 and 90° C.; during said addition of olefine also slowly adding a low aliphatic aldehyde compound selected from formaldehyde and its polymers and agitating the resulting mass until a resinous mass is formed.

3. The process of producing resinous condensation products which comprises condensing a phenol, butylene and a low molecular aliphatic aldehyde compound selected from formaldehyde and its polymers, with the aid of perchloric acid.

4. The process of producing resinous condensation products which comprises condensing a phenol, octene and formaldehyde, with the aid of perchloric acid.

5. The process of producing resinous condensation products which comprises condensing a phenol, dodecene and formaldehyde, with the aid of perchloric acid.

6. The process of producing resinous condensation products which comprises condensing phenol, olefine and formaldehyde, with the aid of perchloric acid.

7. The process of producing resinous condensation products which comprises reacting phenol, butylene and formaldehyde, with the aid of perchloric acid.

8. The process of producing resinous condensation products which comprises reacting phenol, an aliphatic olefine and formaldehyde, with the aid of perchloric acid.

WINFRID HENTRICH.
FRITZ SCHLEGEL.